(12) United States Patent
Sakamoto et al.

(10) Patent No.: US 11,405,398 B2
(45) Date of Patent: Aug. 2, 2022

(54) INFORMATION PROCESSING APPARATUS, INFORMATION PROCESSING SYSTEM, AND INFORMATION PROCESSING METHOD

(71) Applicant: FUJITSU LIMITED, Kawasaki (JP)

(72) Inventors: Takuya Sakamoto, Kawasaki (JP); Kazuaki Nimura, Kawasaki (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 143 days.

(21) Appl. No.: 16/586,875

(22) Filed: Sep. 27, 2019

(65) Prior Publication Data
US 2020/0028852 A1     Jan. 23, 2020

Related U.S. Application Data

(63) Continuation of application No. PCT/JP2018/008297, filed on Mar. 5, 2018.

(30) Foreign Application Priority Data

Apr. 5, 2017   (JP) .............................. JP2017-075322

(51) Int. Cl.
*G06F 21/00*     (2013.01)
*H04L 29/06*     (2006.01)
(Continued)

(52) U.S. Cl.
CPC .............. *H04L 63/101* (2013.01); *G06F 8/30* (2013.01); *G06F 9/455* (2013.01)

(58) Field of Classification Search
CPC ......... H04L 63/101; G06F 8/30; G06F 9/455; G06F 9/44; G06F 21/12; G06F 21/62
See application file for complete search history.

(56) References Cited

U.S. PATENT DOCUMENTS

| 2015/0222618 | A1 | 8/2015 | Pastor et al. |
| 2016/0088049 | A1 | 3/2016 | Seed et al. |
| 2017/0242714 | A1* | 8/2017 | Chen ........................ G06F 9/455 |

FOREIGN PATENT DOCUMENTS

| EP | 2701357 A1 | 2/2014 |
| JP | 2015-530038 A | 10/2015 |
| JP | 2016-524844 A | 8/2016 |

OTHER PUBLICATIONS

Dominique Guinard,"Building the Web of Things", May 2016, [online], retrieved from the Internet, [retrieved on May 22, 2018], <URL:https://www.bcs.org/upload/pdf/the-web-of-things-dguinard-120516.pdf> (51 pages) (Cited in ISR).

(Continued)

*Primary Examiner* — Lisa C Lewis
(74) *Attorney, Agent, or Firm* — Fujitsu Patent Center

(57) ABSTRACT

According to an aspect of the embodiments, an apparatus includes an information processing apparatus includes a memory, and circuitry coupled to the memory and configured to accept registration of a device available for a user and an available function of the device, generate a Web application programming interface according to the registration, and also generates a virtual device that responds to access to the Web application programming interface in cooperation with the device, notify a terminal of information including an access method to the Web application programming interface corresponding to an authenticated user, based on a result of user authentication using the terminal, and accept access to the Web application programming interface from the terminal and accesses the device via the virtual device.

13 Claims, 14 Drawing Sheets

(51) Int. Cl.
*H04L 9/40* (2022.01)
*G06F 8/30* (2018.01)
*G06F 9/455* (2018.01)

(56) References Cited

OTHER PUBLICATIONS

Takuya Sakamoto et al., "Dynamic Connection Management Between Web Apps and Peripheral Devices by Web Driver", Proc. of 2016 IEEE International Conference on Pervasive Computing and Communication Workshops, 2016, [DOI: 10.1109/PERCOMW. 2016. 7457152] (6 pages) (Cited in ISR).
International Search Report and Written Opinion of the International Searching Authority (Form PCT/ISA/210, 220, and 237), mailed in connection with PCT/JP2018/008297 and dated Jun. 5, 2018 (10 pages).
Paulo F. Pires et al.,"A Platform for Integrating Physical Devices in the Internet of Things", 2014 12th IEEE International Conference on Embedded and Ubiquitous Computing, IEEE, Aug. 26, 2014, pp. 234-241, XP032688468 [retrieved on Nov. 18, 2014], Cited in EESR filed herewith.
EESR—Extended European Search Report dated Feb. 24, 2020 for European Patent Application No. 18781328.2.
EPOA—Office Action of European Patent Application No. 18781328.2 dated Oct. 28, 2021. **References cited in the EPOA were previously submitted in the IDS Filed on Apr. 27, 2020.

* cited by examiner

FIG. 4

<ACCESS MANAGEMENT DB>

| DEVICE ID | FUNCTION | USER ID | BEGINNING | END |
|---|---|---|---|---|
| 0123-4567-89ab-cdef | onoff | 00000001 | 2016/10/29 10:00 | 2016/10/29 11:00 |
| ⋮ | ⋮ | ⋮ | ⋮ | ⋮ |

FIG. 5A

```
{"id":"0123-4567-89ab-cdef", "uris": ["http://192.168.0.101/LED"],
"properties": [
  {"name": "rgbw", "valueType": {"type": "number"}, "hrefs":["rgbw"]},
  {"name": "onoff", "valueType": {"type": "boolean"}, "hrefs":["onoff"]}
]
}
```

FIG. 5B

```
{"id":"0123-4567-89ab-cdef", "uris": ["http://192.168.0.1/0123456789abcdef/00000001/xxxxxxx"],
"properties": [
  {"name": "onoff", "valueType": {"type": "boolean"} , "hrefs":["onoff"]}
]
}
```

FIG. 6

| USER ID | TD |
|---|---|
| 00000001 | {"id":"0123-4567-89ab-cdef", "uris": ["http://192.168.0.1/0123456789abcdef/00000001/xxxxxxxx"], "properties": [ {"name": "onoff", "valueType": {"type": "boolean"}, "hrefs":["onoff"]} ] } |

FIG. 10A

```
{"id":"0123-4567-89ab-cdef", "name": "LED Lamp 1", "uris": ["http://192.168.0.1/LEDlamp1/0001/xxxxxxx"],
"properties": [
{"name", "rgbw", "valueType": {"type": "number"}, "writable": true, "enabled":false, "price": 100},
{"name": "onoff", "valueType": {"type": "boolean"}, "writable": true, "hrefs":["onoff"]}
]
}
```

FIG. 10B

```
{"name": "LED Lamp 1", "uris": ["http://192.168.0.1/LEDlamp1/0001/xxxxxxx"],
"properties": [
{"name", "rgbw", "valueType": {"type": "number"}, "writable": true, "enabled":false, "price": 100,
"constructURL": "http://192.168.1.2/Service1/LEDLamp1/0001/xxxxxxx/add.html"},
{"name": "onoff", "valueType": {"type": "boolean"}, "writable": true, "hrefs":["onoff"]}
]
}
```

FIG. 11A

```
{"id":"0123-4567-89ab-cdef", "uris": ["http://192.168.0.1/0123456789abcdef/00000001/"],
"token":"fedcba",
"properties": [
  {"name": "onoff", "valueType": {"type": "boolean"} , "hrefs":["onoff"]}
]
}
```

FIG. 11B

```
POST /0123456789abcdef/00000001/onoff HTTP/1.1
Host: 192.168.0.1
X-Token: fedcba
```

FIG. 13A

<ACCESS MANAGEMENT DB>

| URL | DEVICE ID | ACCESS SOURCE IP ADDRESS | ACCESS DATE AND TIME |
|---|---|---|---|
| ... | ... | ... | ... |
| http://192.168.0.1/0123456789abcdef/00000001/xxxxxxxx/onoff | 0123-4567-89ab-cdef | 192.168.1.100 | 2016/10/29 10:05:03 |
| http://192.168.0.1/0123456789abcdef/00000001/xxxxxxxx/onoff | 0123-4567-89ab-cdef | 192.168.2.112 | 2016/10/29 10:05:05 |

FIG. 13B

<ACCESS RULE MANAGEMENT DB>

| DEVICE ID | NOTIFICATION DESTINATION URL | RULE ID |
|---|---|---|
| 0123-4567-89ab-cdef | http://192.168.0.100/service1/notify | 0001 |
| 0123-4567-89ab-cdef | http://192.168.0.100/service1/notify | 0002 |
| ... | ... | ... |

FIG. 13C

{"id": "0123-4567-89ab-cdef", "ruleid": 0001,
[{"ip":"192.168.1.100", "date":"2016/10/29T10:05:03"},
{"ip":"192.168.2.112", "date":"2016/10/29T10:05:05"}]}

FIG. 14

```
{"id":"0123-4567-89ab-cdef", "uris": ["http://192.168.0.1/0123456789abcdef/00000001/xxxxxxx"],
"begindate": "2017/10/29 10:00",
"enddate": "2017/10/29 11:00",
"properties": [
{"name": "onoff", "valueType": {"type": "boolean"}, "hrefs":["onoff"]}
]
}
```

INFORMATION PROCESSING APPARATUS, INFORMATION PROCESSING SYSTEM, AND INFORMATION PROCESSING METHOD

CROSS-REFERENCE TO RELATED APPLICATION

This application is a continuation application of International Application PCT/JP2018/008297 filed on Mar. 5, 2018 and designated the U.S., the entire contents of which are incorporated herein by reference. The International Application PCT/JP2018/008297 is based upon and claims the benefit of priority of the prior Japanese Patent Application No. 2017-075322, filed on Apr. 5, 2017, the entire contents of which are incorporated herein by reference.

FIELD

The present invention relates to an information processing apparatus, an information processing system, and an information processing method.

BACKGROUND

In recent years, with the progress of the Internet of Things (IoT), various devices are connected to networks such as the Internet, and cloud services can be used from various devices (referred to as IoT devices). Meanwhile, services called shared economy (for example, car sharing and Airbnb) in which various things are shared, and lent and rented are also expanding. As an extension of these technologies, sharing of devices that allows part or all of functions included in a shared IoT device or an IoT device of another person to be used for a certain period of time has also been examined.

Recently, as a mechanism for operating the IoT device by way of a network or acquiring information from the IoT device, a technology for accessing the device using a Web technology called Web of Things (WoT) is being examined. In this technology, a terminal accesses the device using a document called Thing Description in which the device name, the name of a function included in the device, an access method to the function, and the like are written.

Note that, as a technology relating to access control of the device, there is known a technology of making connection by touching the device with the terminal to perform authentication and key exchange, and implementing access to the device using the exchanged keys.

For example, related techniques have been disclosed in Japanese National Publication of International Patent Application No. 2015-530038.

SUMMARY

According to an aspect of the embodiments, an apparatus includes an information processing apparatus includes a memory, and circuitry coupled to the memory and configured to accept registration of a device available for a user and an available function of the device, generate a Web application programming interface according to the registration, and also generates a virtual device that responds to access to the Web application programming interface in cooperation with the device, notify a terminal of information including an access method to the Web application programming interface corresponding to an authenticated user, based on a result of user authentication using the terminal, and accept access to the Web application programming interface from the terminal and accesses the device via the virtual device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of the data structure of an access management database (DB);

FIG. 5A is a diagram illustrating an example of TD managed by a TD management DB;

FIG. 5B is a diagram illustrating an example of TD managed by a TD repository;

FIG. 6 is a diagram illustrating an example of data stored in the TD repository;

FIGS. 10A and 10B are diagrams illustrating TD according to a second embodiment;

FIG. 11A is a diagram illustrating TD according to a third embodiment;

FIG. 11B is a diagram illustrating an example of a hypertext transfer protocol (HTTP) header portion according to the third embodiment;

FIG. 13A is a diagram illustrating a data structure of an API access management DB according to the fourth embodiment;

FIG. 13B is a diagram illustrating a data structure of an access rule management DB;

FIG. 13C is a diagram illustrating an example of a notification format; and

FIG. 14 is a diagram illustrating TD according to a modification 3.

DESCRIPTION OF EMBODIMENTS

When a device is shared, different users have different available devices and available device functions. Therefore, it is necessary to perform access control according to the user.

In one aspect, the present invention aims to provide an Information processing apparatus, an information processing system, and an information processing method capable of performing access control of a device according to a user.

First Embodiment

Hereinafter, a first embodiment of an information processing system will be described in detail based on FIGS. 1 to 9.

Figure 1:
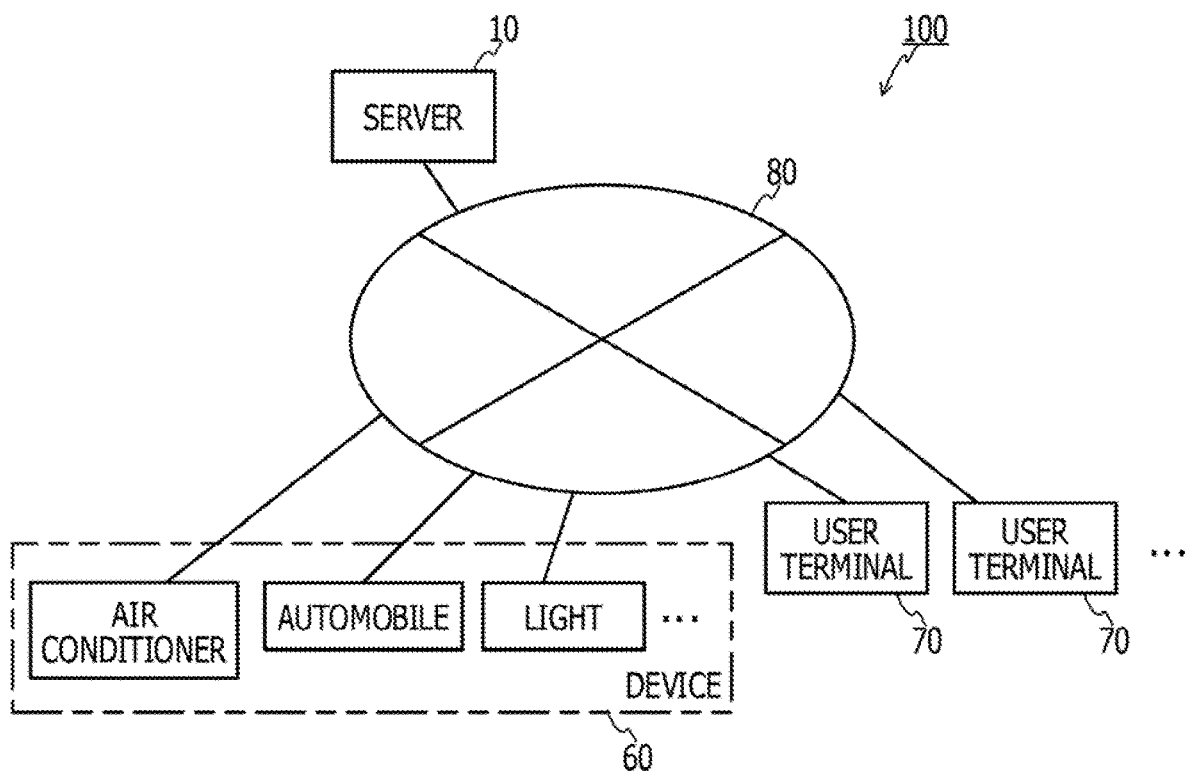
FIG. 1 is a diagram schematically illustrating a configuration of an information processing system according to an embodiment.

FIG. 1 schematically illustrates a configuration of the information processing system 100 according to the first embodiment. The information processing system 100 includes a device 60, user terminals 70, and a server 10. The device 60 and the user terminals 70 are connected to a network 80 such as the Internet via a wireless local area network (LAN), a mobile phone network, or the like. The server 10 is also connected to the network 80. The information processing system 100 of this first embodiment is a system for an administrator (owner or the like) who manages the device 60 to allow a user who holds the user terminal 70 to use the device 60.

The device 60 is a piece of equipment present in various places, such as an air conditioner, an automobile, a light, and a camera, and performs some control or returns some information in response to a call for the Web API.

Figure 2A:
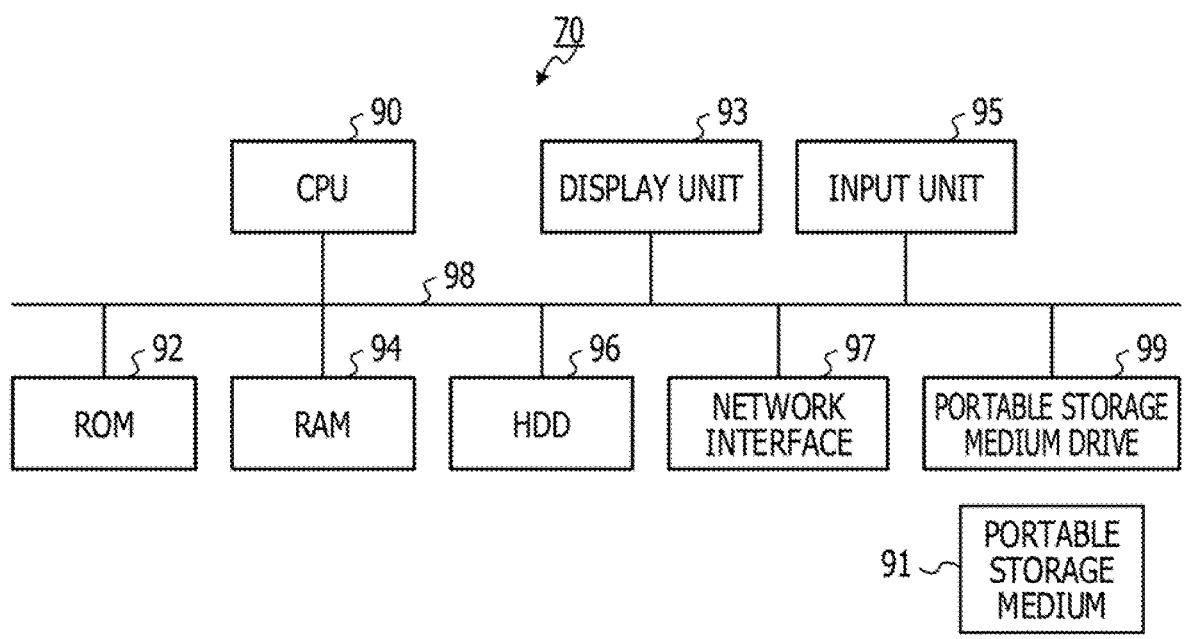
FIG. 2A is a diagram illustrating a hardware configuration of a user terminal.

The user terminal 70 is a terminal carried by the user and used to control the device 60, and is assumed as, for example, a smartphone or a tablet terminal. FIG. 2A illustrates an example of the hardware configuration of the user terminal 70. As illustrated in FIG. 2A, the user terminal 70 includes a central processing unit (CPU) 90, a read only memory (ROM) 92, a random access memory (RAM) 94, a storage unit (in this example, a hard disk drive (HDD)) 96, a network interface 97, a display unit 93, an input unit 95, a portable storage medium drive 99, and the like. Each component of the user terminal 70 mentioned above is connected to a bus 98. In the user terminal 70, diverse functions are implemented by the CPU 90 executing a program stored in the ROM 92 or the HDD 96, or a program read by the portable storage medium drive 99 from a portable storage medium 91. Note that the user terminals 70 also include a terminal (administrator terminal 70' (see FIG. 3)) available for the administrator who manages the device 60.

Figure 2B:
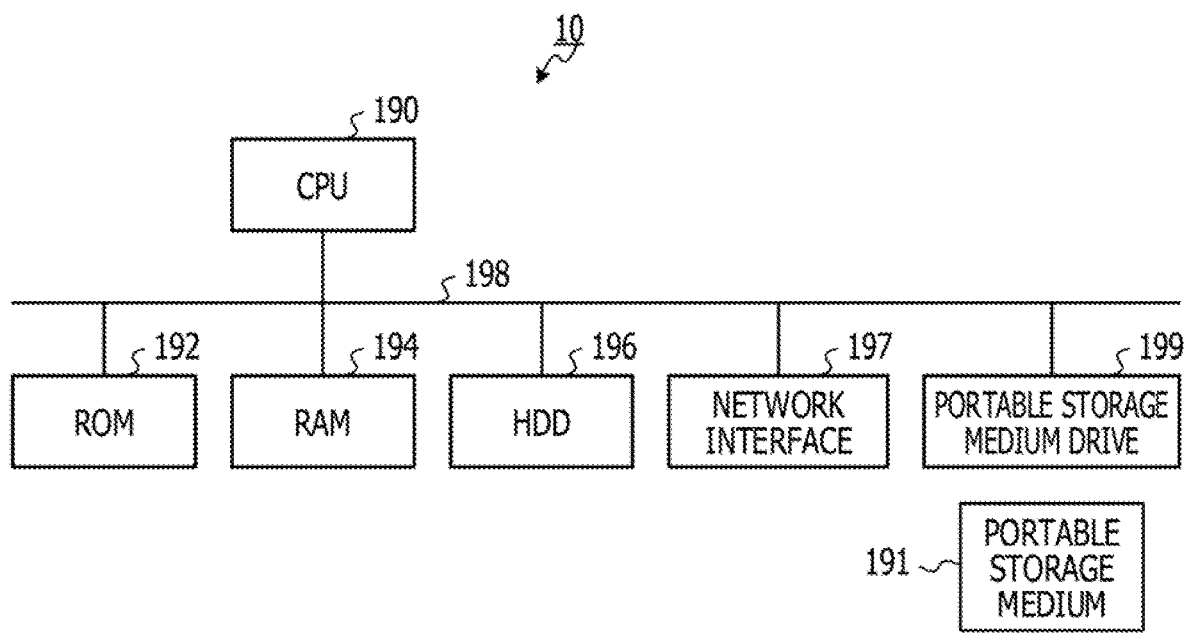
FIG. 2B is a diagram illustrating a hardware configuration of a server.

The server 10 mediates communication between the user terminal 70 and the device 60 and executes control of access to the device 60 from the user terminal 70. FIG. 2B illustrates an example of the hardware configuration of the server 10. As illustrated in FIG. 2B, the server 10 includes a central processing unit (CPU) 190, a read only memory (ROM) 192, a random access memory (RAM) 194, a storage unit (in this example, a hard disk drive (HDD)) 196, a network interface 197, a portable storage medium drive 199, and the like. Each component of the server 10 mentioned above is connected to a bus 198. In the server 10, the CPU 190 executes a program stored in the ROM 192 or the HDD 196, or a program read by the portable storage medium drive 199 from a portable storage medium 191 to function as each unit Illustrated in FIG. 3. Note that FIG. 3 also depicts diverse DBs and the like stored in the HDD 196 and the like.

Figure 3:
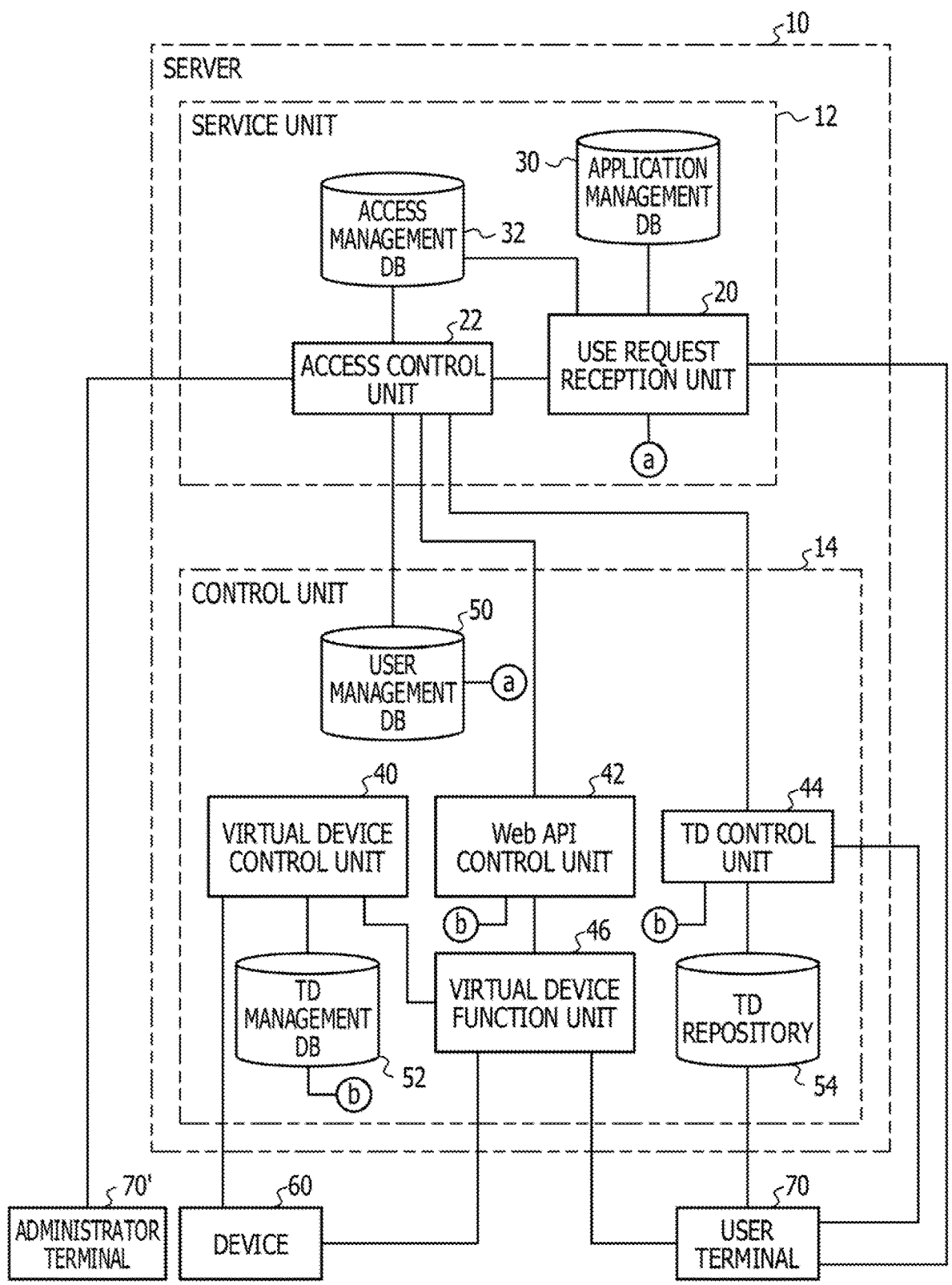
FIG. 3 is a functional block diagram of the server.

Next, each unit of the server 10 will be specifically described based on FIG. 3. In the server 10, the CPU 190 functions as a service unit 12 and a control unit 14 by executing a program.

In FIG. 3, the service unit 12 is prepared for each service and includes a use request reception unit 20 and an access control unit 22. Meanwhile, the control unit 14 is a platform and includes a virtual device control unit 40, a Web API control unit 42, a TD control unit 44, and a virtual device function unit 46.

Here, in WoT under discussion in World Wide Web Consortium (W3C), when a terminal accesses a device, access is made depending on information called Thing Description (TD). While various methods have been examined for the mechanism for the terminal to acquire the TD, one of these methods is a method in which the device registers its own TD in the server 10 (TD repository 54), and the terminal performs a search using part of information included in the registered TD (for example, the name or ID of the device) as a key to acquire the TD. In the present embodiment, this method is applied.

Specifically, in the present embodiment, the administrator of the device registers the URL of the virtual device control unit 40 of the server 10 in the device, instead of registering the URL of the TD repository 54 included in the server 10. With this configuration, the TD of the device is sent to the virtual device control unit 40 and the TD can be managed in a TD management DB 52.

In addition, the administrator of the device arranges the conditions under which the device will be lent out, to contract with a service provider. For example, if a car is to be lent out, a contract is made such that the car is lent out for 200 yen per hour on weekdays and 300 yen per hour on holidays. Then, the service provider lends out the car to various users according to the arranged conditions. Contract information between the user and the administrator is managed in the service unit 12 in association with the device ID and the user ID.

The use request reception unit 20 registers the contract information in an access management DB 32 when a use procedure (use contract) for the device using a service application managed by an application management DB 30 is made from the user terminal 70 to which the service application has been downloaded.

More specifically, the user uses the service application on the user terminal 70 to access the service. Then, after the user authentication is performed, a plan (information on the available device 60 and function of the device 60 registered in the access management DB 32) provided by the use request reception unit 20 is confirmed and, as a result of the confirmation, a reservation (contract) such as renting the device 60 from a certain time to a certain time is made. This flow relating to the contract is similar to ordinary online shopping or online service for hotel reservation. By this contract, the device 60 registered by the administrator of the device is associated with the contracted user in the access management DB 32.

Here, the access management DB 32 is a database that manages information registered from the administrator terminal 70' (the contract information with the service provider) and a use request (the contents of the use contract) acquired from the user terminal 70. Specifically, as illustrated in FIG. 4, the access management DB 32 includes respective fields of "device ID", "function", "user ID", "beginning", and "end".

The field of "device ID" stores identification information on a device (for example, assumed as a light). The field of "function" stores the function of the device contracted for use (turning on and off of the light in FIG. 4). The field of "user ID" stores identification information on the contracted user. The fields of "beginning" and "end" store the use beginning date and time and the use end date and time for the device. In the example in FIG. 4, the contents of a contract concluded with a user with the user ID "00000001" to use the function "onoff" of a light with the device ID "0123-4567-89ab-cdef" from "2016/10/29 10:00" until "2016/10/29 11:00" are stored.

The access control unit 22 stores information registered from the administrator terminal 70' in the access management DB 32. In addition, the access control unit 22 refers to a user management DB 50 and the access management DB 32 to cause the Web API control unit 42 to generate the Web API of the virtual device or causes the TD control unit 44 to generate the TD of the virtual device. Furthermore, when TD is requested from the user terminal 70, the access control unit 22 issues an instruction to the TD control unit 44 and causes the TD control unit 44 to transmit the TD corresponding to the user to the user terminal 70.

Note that the user management DB 50 is a database that stores combinations of user IDs and passwords.

Upon accepting the Thing Description (T)) of the device 60 from the device 60, the virtual device control unit 40 stores the accepted TD in the TD management DB 52 and additionally, based on the accepted TD, causes the virtual device function unit 46 to generate a virtual device (causes the virtual device function unit 46 to function as a virtual device). The virtual device function unit 46 functions as a virtual device under the instruction of the virtual device control unit 40. In addition, the Web API control unit 42 generates the Web API of the virtual device based on the access management DB 32 and the TD, and gives the generated Web API to the virtual device. The TD control unit 44 generates the TD of the virtual device based on the access management DB 32 and the TD, and registers the generated TD in the TD repository 54. Note that the TD control unit 44 appropriately monitors the TD repository 54 to update the TD or delete unnecessary TD.

Here, the TD stored in the TD management DB 52 is as illustrated in FIG. 5A as an example. Based on information from this TD and information from the access management DB 32 (see FIG. 4), the TD control unit 44 generates TD for the virtual device. Specifically, in the TD in FIG. 5A, two functions, namely, "rgbw" and "onoff" are provided. On the other hand, as Illustrated in FIG. 5B, the TD of the virtual device has only the function of "onoff". This is because, in the contract stored in the access management DB 32, only a contract for using "onoff" is concluded. Note that, in FIGS. 5A and 5B, "uris" indicates a part of a URL for accessing the device or the virtual device. When the function of "onoff" is accessed, the access can be made by combining information in "hrefs" and the URL contained in an area where information on the function of "onoff" is written. For example, when the access destination is the device, the function of "onoff" can be called by accessing the URL "http://192.168.0.101/LED/onoff", as depicted in FIG. 5A. Meanwhile, when the access destination is the virtual device, the function of "onoff" can be called by accessing the URL "http://192.168.0.1/0123456789abcdef/00000001/xxxxxxxx/onoff", as depicted in FIG. 5B. In addition, by property using http-get and http-post, the Web API can be used for both of acquiring the state and changing the state. That is, http-get is used to acquire the value of onoff, while http-post is used to change the value of onoff. For example, in the case of http-get, by sending back a value such as {"value": true} as a return value, it can be worked out that the current state is true (the light is currently turned on), or in the case of http-post, by putting {"value": true} in a body portion of http-post, it is possible to change the value to true (that is, turn on the light). Note that uris of the virtual device is an address that can be handled by the virtual device and needs to be unique among virtual devices. In other words, TD for multiple devices is not allowed to have same uris. If TD for multiple devices has the same uris, it is no longer possible to find out which device the request is for, when the virtual device is accessed. Therefore, at the time of generation of TD, it is ensured that uris is unique, for example, by allocating numbers with serial numbers. Note that "name" indicates the name of a function, and "valueType" indicates the type of an argument assigned when the function is called. In the case of "onoff", since valueType has "boolean", true or false is assigned. That is, it is possible to assign whether to turn on or off the light by assigning true or false in the body portion of the HTTP protocol when the URL described above is accessed. The TD control unit 44 registers, in the TD repository 54, data as illustrated in FIG. 6 in which the TD in FIG. 5B is associated with the user ID. This processing for the TD repository 54 is executed periodically or nonperiodically in a repeated manner. In the above contract, the effective term is only from 10/29 10:00 to 11:00; accordingly, if the date and time is out of this range, the TD is not registered and the TD is deleted if the TD has been registered.

After the TD is registered as described above, the user can use the device 60 in line with the contract date and time. When the user uses the device 60, user authentication is performed through the user terminal 70. In this case, the access control unit 22 refers to the user management DB 50 to perform user authentication similar to the user authentication of an ordinary Internet service. Then, the access control unit 22 issues an instruction to the TD control unit 44 to transmit TD according to the user from the TD repository 54 to the user terminal 70. This allows the user terminal 70 to acquire the TD about the function of the device available for the user.

The user terminal 70 parses the acquired TD to calculate a URL corresponding to the function, and accesses the virtual device (calls the Web API) using the calculated URL. The virtual device function unit 46 (virtual device) receives the Web API access, and calculates which function of which device has been called from the TD repository 54, depending on the received URL.

For example, if http://192.168.0.1/0123456789abcdef/00000001/xxxxxxxxoo/onoff is accessed, it can be found out from information in the TD repository 54 that the "onoff" function of the device ID "0123-4567-89ab-cdef" has been accessed. That is, the TD of the device can be located in the TD management DB 52 based on the device ID, and the access method to the above function of the device can be located from the function name. Based on these pieces of information, the virtual device function unit 46 accesses the device (calls the Web API). The device performs processing in response to the Web API call. For example, if the device is a light, processing such as switching on the light is performed. Then, the device sends back a response to the virtual device function unit 46 when the execution of the processing is completed. The virtual device function unit 46 obtains the response from the device and transfers the response to the user terminal 70. As described above, the device 60 can be controlled from the user terminal 70.

Note that, when accepting the Web API call, the server 10 (virtual device function unit 46) calculates the access method to the device from the TD repository 54 or the TD management DB 52; accordingly, if the Web API call falls outside the contract, the calculation fails and device access fails. Therefore, in the present embodiment, only the access from the appropriate user to the contracted device is allowed.

(About Processing of Information Processing System 100)

Next, the flow of processing in the information processing system 100 will be described in accordance with flowcharts based on FIGS. 7 to 9.

(TD Registration Processing)

Figure 7A:
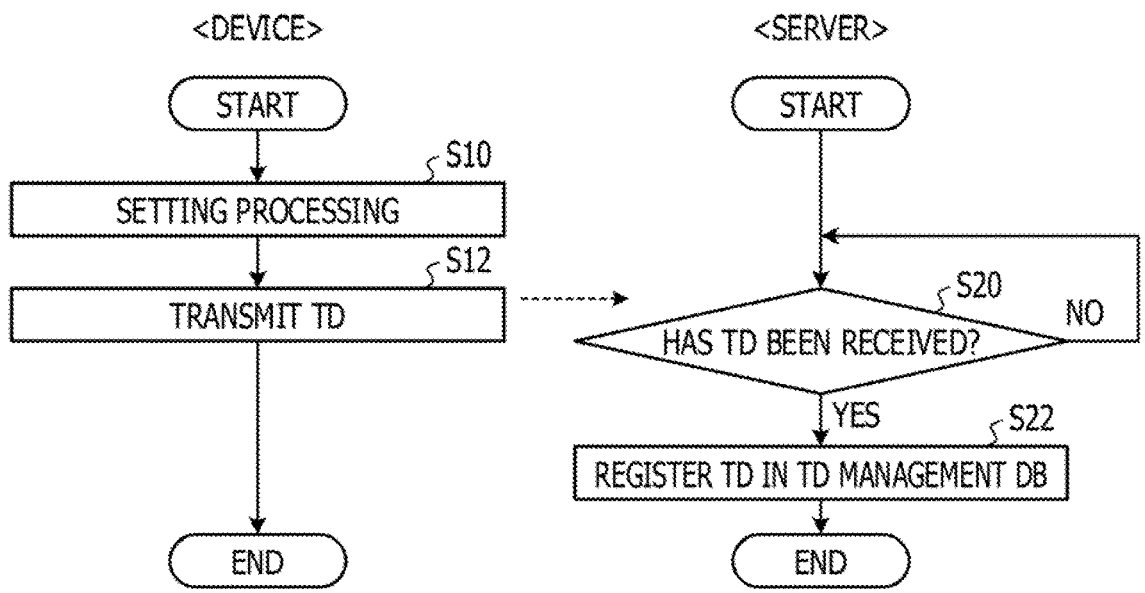
FIG. 7A is a flowchart illustrating TD registration processing.

FIG. 7A illustrates a flowchart of TD registration processing. The TD registration processing is processing executed by the device 60 and the server 10. First, in the device 60, after the administrator registers the URL of the virtual device control unit 40 of the server 10, URL setting processing is executed in step S10. Subsequently, in step S12, the device 60 transmits the TD to the URL set by the administrator.

Meanwhile, in step S20, the virtual device control unit 40 of the server 10 stands by until receiving the TD. Upon receiving the TD, the virtual device control unit 40 proceeds to step S22 and stores the TD in the TD management DB 52.

Thus, the TD registration processing ends.

(Device Registration Processing)

Figure 7B:
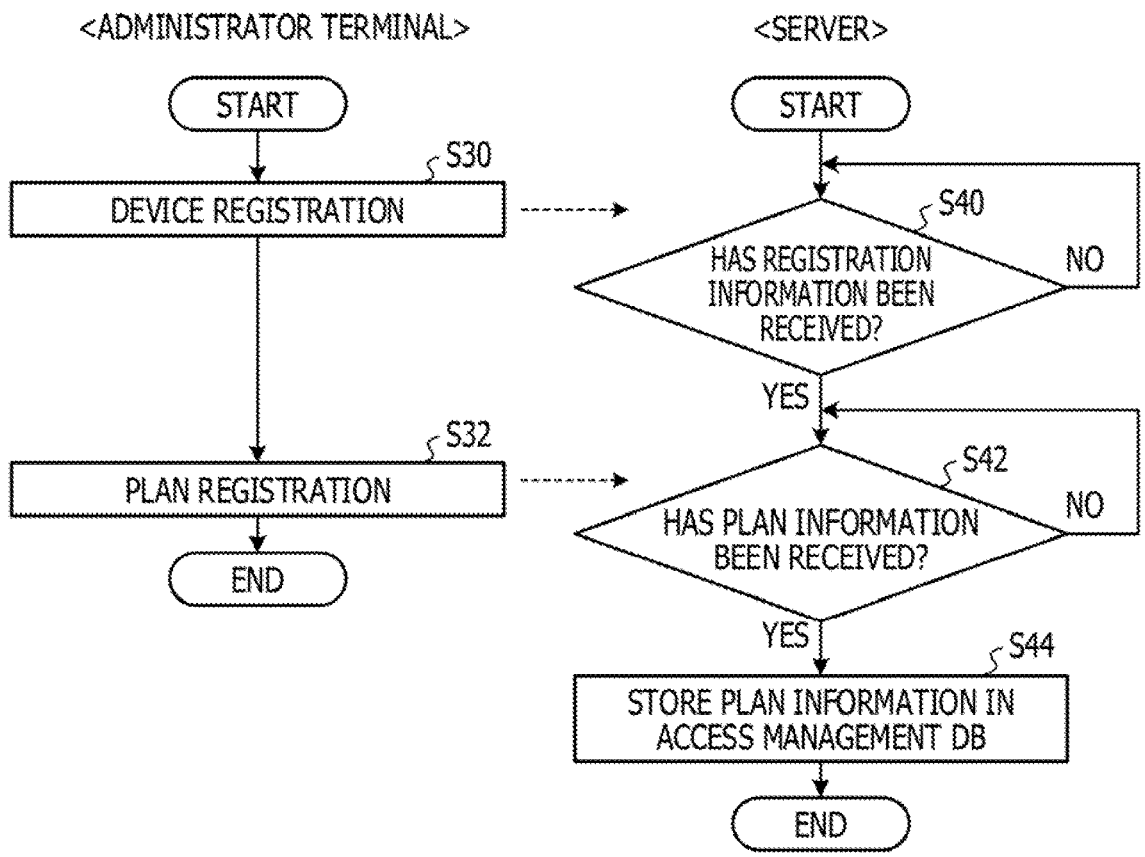
FIG. 7B is a flowchart illustrating device registration processing.

FIG. 7B illustrates a flowchart of device registration processing. The device registration processing is processing executed by the administrator terminal 70' and the server 10. First, in step S30, the administrator terminal 70' executes the device registration processing. In this case, the administrator inputs the device to be lent out on the administrator terminal 70' and then the administrator terminal 70' transmits information on the input device to the server 10. In addition, the administrator terminal 70' executes plan registration processing in step S32. In this case, the administrator inputs under what conditions the device is to be lent out and then the administrator terminal 70' transmits the input information to the server 10.

Meanwhile, in the server 10, the access control unit 22 stands by until receiving registration information and receiving plan information (S40 and S42). Therefore, upon receiving these pieces of information, the access control unit 22 proceeds to step S44 and stores the plan information in the access management DB 32.

Thus, the device registration processing ends.

(User Registration Processing)

Figure 8:
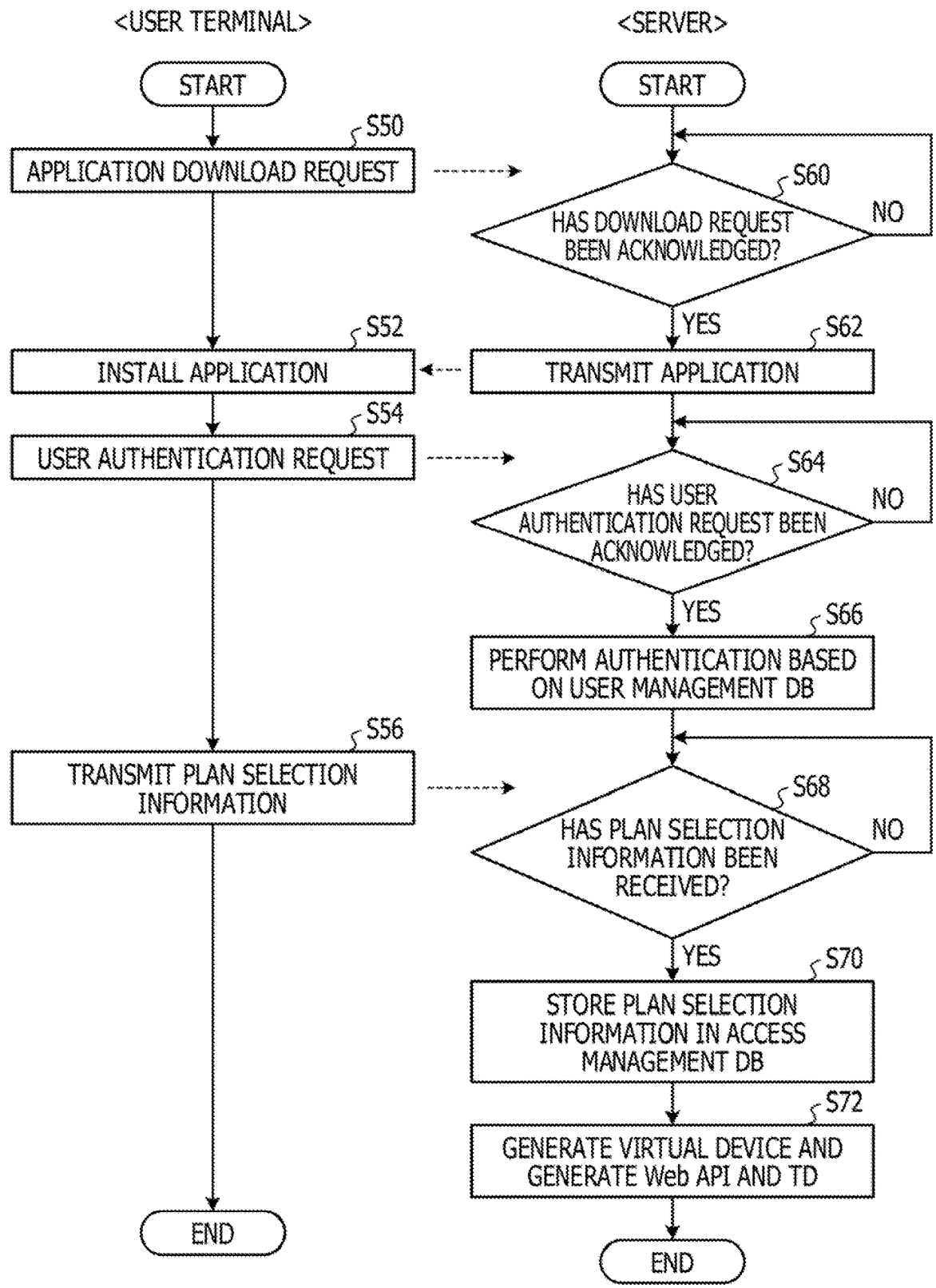
FIG. 8 is a flowchart illustrating user registration processing.

FIG. 8 illustrates a flowchart of user registration processing. The processing in FIG. 8 is processing executed for the user to make a contract to use (rent) a device. In the processing in FIG. 8, first, in step S50, the user terminal 70 transmits an application download request to the server 10 (use request reception unit 20) according to the operation of the user. In the meantime, on the side of the server 10, since the use request reception unit 20 stands by until the download request is transmitted (S60), the use request reception unit 20 proceeds to step S62 at the stage of acknowledging the request, and acquires the application (service application) from the application management DB 30 to transmit the acquired application to the user terminal 70. In this case, the user terminal 70 installs the application in step S52.

After the application is installed, the user terminal 70 transmits a user authentication request to the use request reception unit 20 of the server 10 in step S54 according to the operation of the user. Since the use request reception unit 20 stands by until the user authentication request is acknowledged in step S64, the use request reception unit 20 proceeds to step S66 when the user authentication request is acknowledged, and executes user authentication based on the user management DB 50. Note that, when the user authentication is successful, a selectable plan is displayed on the application on the user terminal 70, based on the data stored in the access management DB 32.

Subsequently, when a plan is selected in accordance with the operation of the user of the user terminal 70, the user terminal 70 transmits plan selection information to the use request reception unit 20 of the server 10 in step S56. In the meantime, on the side of the server 10, since the use request reception unit 20 stands by until receiving the plan selection information in step S68, the use request reception unit 20 proceeds to step S70 at the stage of receiving the plan selection information.

Upon proceeding to step S70, the use request reception unit 20 stores the plan selection information in the access management DB 32. That is, one of the plans is linked with the user ID of the user.

Subsequently, in step S72, the virtual device control unit 40 generates a virtual device based on the plan selected by the user (causes the virtual device function unit 46 to function). In addition, the Web API control unit 42 generates the Web API of the virtual device, and the TD control unit 44 generates TD of the virtual device.

Thus, the user registration processing ends.

(Access Control Processing for Device)

Figure 9:
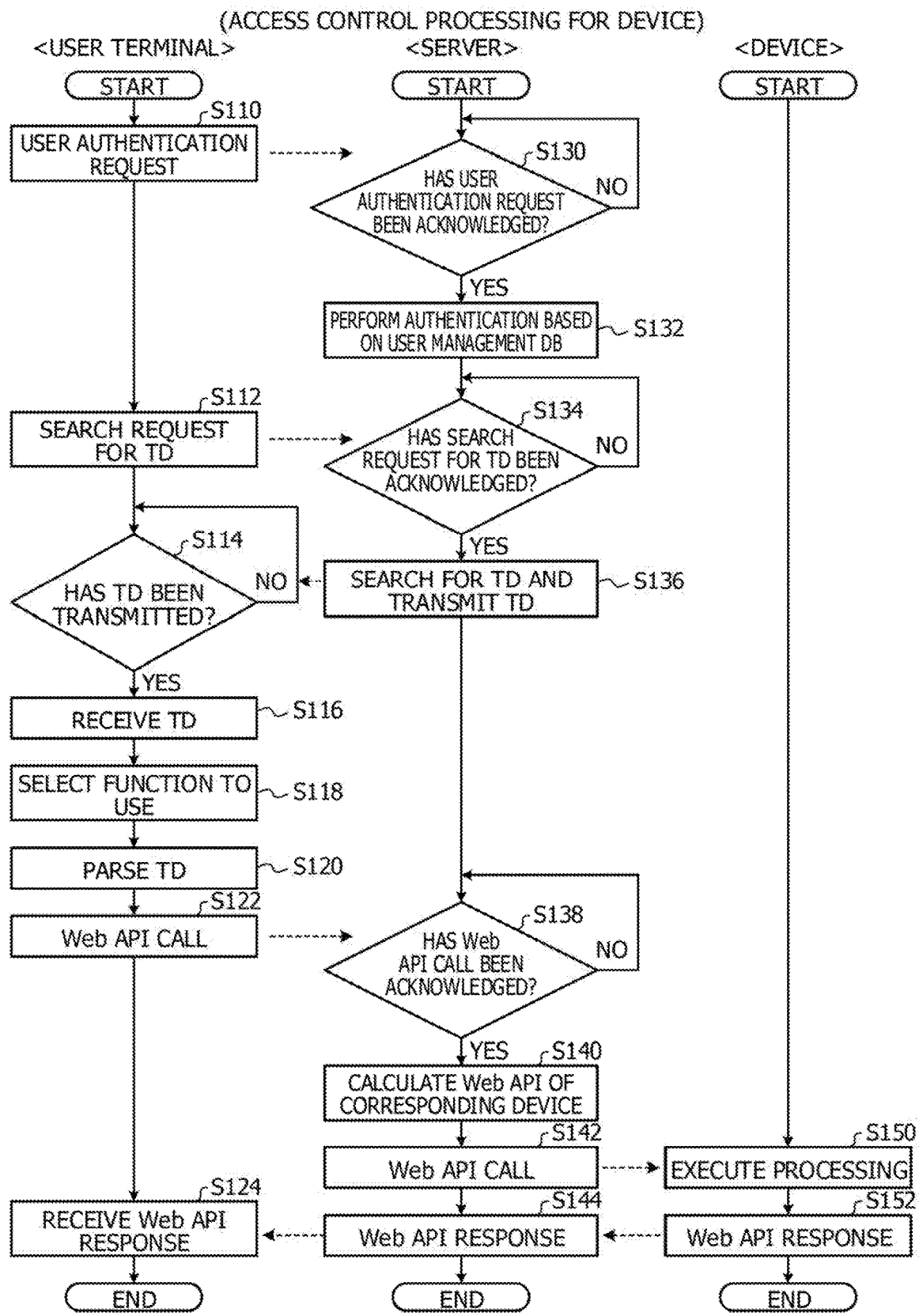
FIG. 9 is a flowchart illustrating access control processing for a device.

FIG. 9 illustrates a flowchart of access control processing for the device. The access control processing for the device is processing executed by the user terminal 70, the server 10, and the device 60. This processing is processing when the user uses the device 60 using the user terminal 70.

In the processing in FIG. 9, first, in step S110, the user authentication request using the user ID and the password is made from the user terminal 70. Meanwhile, since the access control unit 22 of the server 10 stands by until user authentication is performed (S130), the access control unit 22 proceeds to step S132 when the user authentication request is acknowledged. In step S132, the access control unit 22 performs user authentication with reference to the user management DB 50.

Subsequently, in step S112, a search request for TD is issued from the application of the user terminal 70. In this case, since the access control unit 22 stands by until acknowledging the search request for TD (S134), the access control unit 22 proceeds to step S136 when the search request TD is acknowledged. In step S136, the access control unit 22 issues an instruction to the TD control unit 44 to search for TD corresponding to the authenticated user from the TD repository 54 and transmit the retrieved TD to the user terminal 70.

Since the user terminal 70 stands by until the TD is transmitted in step S114, the user terminal 70 proceeds to step S116 and receives the TD when the TD is transmitted.

Subsequently, upon proceeding to step S118, the user terminal 70 selects which function (which TD) to use according to the operation of the user, and parses the TD in next step S120 to calculate a URL corresponding to the function. Then, in step S122, the user terminal 70 accesses the virtual device (performs Web API call) using the calculated URL.

Meanwhile, since the virtual device function unit 46 (virtual device) of the server 10 stands by until acknowledging the Web API call from the user terminal 70 (S138), the virtual device function unit 46 (virtual device) proceeds to step S140 when the Web API call is acknowledged. Upon proceeding to step S140, the virtual device function unit 46 (virtual device) calculates which function of which device has been called from the TD repository 54, depending on the received URL. Subsequently, in step S142, the virtual device function unit 46 (virtual device) accesses the device (calls the Web API) based on the calculated information.

The device 60 accessed (for which the Web API is called) from the virtual device function unit 46 executes processing in step S150 in response to the Web API. Then, the device 60 sends back a response to the virtual device function unit 46 in step S152 when the execution of the processing is completed. In this case, the virtual device function unit 46 obtains the response from the device 60 and transfers the response to the user terminal 70 in step S144; the user terminal 70 receives the response in step S124.

Thus, the access control processing for the device ends.

As described so far in detail, according to this first embodiment, the use request reception unit 20 accepts the registration of a device available for the user and an available function of the device to store the registered device and function in the access management DB 32, the Web API control unit 42 generates the Web API according to the registration, and the virtual device control unit 40 causes the virtual device function unit 46 to function as a virtual device that responds to the access to the Web API in cooperation with the device. Then, based on the result of user authentication using the user terminal 70, the TD control unit 44 transmits, to the user terminal 70, TD including an access method to the Web API corresponding to the authenticated user, and the virtual device function unit 46 accepts the access to the Web API (Web API call) from the user terminal 70, and accesses the device. With this configuration, in this first embodiment, access control of the device according to the user can be performed without adding a function to the device side. In this case, since the function is not added to the device whose resource is generally smaller than the resource of the server 10, the function relating to the access control does not stress the resource of the device. In addition, the user can access the device contracted for use, in a similar manner to an ordinary access to the device. Furthermore, in this first embodiment, since the user terminal 70 accesses the virtual device using a temporary URL calculated from the TD, the security improvement can be achieved.

Second Embodiment

Next, a second embodiment will be described based on FIG. 10. This second embodiment is an example in which information is further added to the TD of the first embodiment. FIG. 10A represents an example in which the item of "price" is added as information not present in the TD of the first embodiment, and FIG. 10B represents an example in which the item of "contractURL" is likewise added.

In the case of the TD in FIG. 10A, information is added, the information indicating that the Web API for color change (rgbw) cannot be currently used ("enabled": false), but can be used if an additional cost is paid. That is, in the user terminal 70, by parsing the TD and acquiring this information, it is possible to indicate that the user can use the color change function by paying the additional cost.

Meanwhile, in the case of the TD in FIG. 10B, a URL for accessing the Web page for the additional contract is added as contractURL. When the user wants to use a new function of the device, the user can add an available function by accessing contractURL and making an addition procedure on the Web page. Note that the addition procedure can be implemented by similar processing to the processing for the use contract described in the first embodiment. Once this addition procedure is made, the access control unit 22 issues an instruction to the TD control unit 44 to update the TD stored in the TD repository 54. With this processing, the action of the virtual device function unit 46 (virtual device) upon accepting the Web API call is also changed.

As described so far, according to this second embodiment, since the TD contains information necessary for updating the function of the device available for the user, the user can appropriately, for example, add an available function of the device, if necessary.

Third Embodiment

Next, a third embodiment will be described based on FIG. 11. This third embodiment differs from the first embodiment in that Information difficult to estimate is appended to the URL of the Web API calculated from the TD registered in the TD repository 54.

In this third embodiment, as illustrated in FIG. 11A, a character string as key information is generated using a pseudo random number or the like, and the generated character string (token) is added to the URL assigned in the uris portion of the TD to be registered in the TD repository 54. As described above in the first embodiment, uris of the virtual device is an address that can be handled by the virtual device and needs to be unique among virtual devices; however, as long as these requirements are adhered to, the character string can be freely designated. For this reason, the complexity of the character string can reduce the possibility that an unauthorized person predicts the character string and makes illegal access.

Note that this technique is not restricted to the example in FIG. 11A and, for example, in the case of HTTP access, a character string may be added to the header portion of HTTP as illustrated in FIG. 11B. In addition, a character string may be added to the body portion of HTTP. Furthermore, the character string may be included in the TD and passed to the user terminal 70, or may be passed to the user terminal 70 through another route.

When receiving a Web API call from the user terminal 70, the virtual device function unit 46 (virtual device) first confirms token and then performs access control of the device.

As described so far, according to this third embodiment, since the TD contains address information for accessing the Web API and the character string as the key information, the possibility of illegal access from the third party can be reduced.

Fourth Embodiment

Next, a fourth embodiment will be described based on FIGS. 12 and 13. In this fourth embodiment, in order to prevent illegal access to the device 60, the server 10 checks access to the virtual device.

Figure 12:
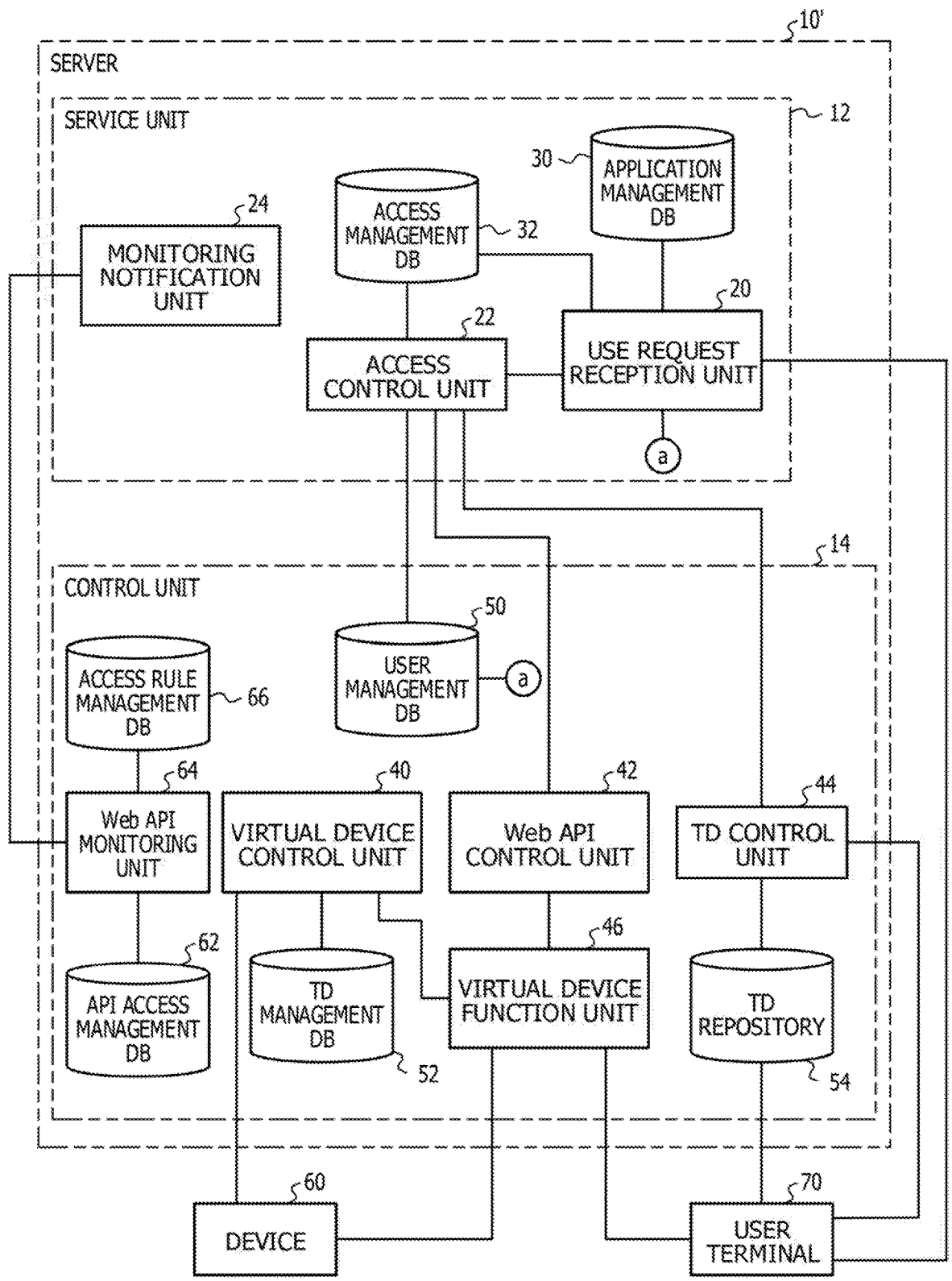
FIG. 12 is a functional block diagram of a server according to a fourth embodiment.

FIG. 12 illustrates a functional block diagram of a server 10' according to this fourth embodiment. As illustrated in FIG. 12, in this fourth embodiment, a control unit 14 includes a Web API monitoring unit 64, and also includes an API access management DB 62 and an access rule management DB 66. In addition, a service unit 12 includes a monitoring notification unit 24.

The Web API monitoring unit 64 determines whether there is a possibility that illegal access has been made, based on information on access from the user terminal 70 to the virtual device stored in the API access management DB 62, and an access rule stored in the access rule management DB 66. When the Web API monitoring unit 64 determines that there is a possibility that illegal access has been made, the Web API monitoring unit 64 notifies the monitoring notification unit 24 to that effect. When notified by the Web API monitoring unit 64, the monitoring notification unit 24 notifies a notification destination URL (for example, the user terminal 70) that there is a possibility that illegal access has been made.

Here, the API access management DB 62 has a data structure as illustrated in FIG. 13A. As illustrated in FIG. 13A, the API access management DB 62 has respective fields of "URL", "device ID", "access source IP address", and "access date and time". The field of "URL" stores a URL accessed from the user terminal 70. The field of "device ID" stores identification Information on the virtual device. The field of "access source IP address" stores the IP address of the user terminal 70. The field of "access date and time" stores the date and time of access made from the user terminal 70.

In addition, the access rule management DB 66 has a data structure as illustrated in FIG. 13B. As illustrated in FIG. 13B, the access rule management DB 66 has respective fields of "device ID", "notification destination URL", and "rule ID". The field of "device ID" stores identification information on the virtual device that has been accessed, and the field of "notification destination URL" stores a URL indicating the notification destination. The field of "rule ID" stores identification information on a rule for determining whether there is a possibility of illegal access.

When accessed from the user terminal 70, the virtual device specifies the device ID from the TD repository 54 based on the received URL, and stores the current date and time, and the IP address of the user terminal 70 as the access source, in the API access management DB 62. Then, in response to the addition of information to the API access management DB 62, the Web API monitoring unit 64 refers to the access rule management DB 66 to verify whether the rule is met (whether the access is valid).

For example, if the rule is that "the IP address from which access is made has not been changed from the previous access", the Web API monitoring unit 64 confirms the IP address of the access source and determines whether the IP address has not been changed from the previous access. Then, when the IP address of the access source has been changed, the monitoring notification unit 24 notifies the notification destination URL to confirm whether the access can be permitted. Alternatively, if the rule is "when there is access a predetermined number of times (for example, twice) or more within a predetermined time (for example, within one second)" or "when there is access from different access source IP addresses within a predetermined time (within 10 seconds)", the Web API monitoring unit 64 determines whether such access has been made. Then, when such access has been made, the monitoring notification unit 24 notifies the notification destination URL.

Note that a variety of formats of notification can be adopted and, for example, notification as illustrated in FIG. 13C can be made.

As described so far, according to this fourth embodiment, the server 10' includes the Web API monitoring unit 64 that monitors access to the Web API, and the monitoring notification unit 24 that makes notification based on the monitoring result of the Web API monitoring unit 64. With this configuration, when the Web API monitoring unit 64 determines that there is a possibility that illegal access has been made, the monitoring notification unit 24 can notify the user or the like to that effect.

Fifth Embodiment

Next, a fifth embodiment will be described. The fifth embodiment differs from the first embodiment in that the virtual device has a cache function.

As described earlier, http-get is used to acquire the current value of onoff of the device 60, and http-post is used to change the value. In this fifth embodiment, the virtual device accesses the device 60 to acquire the value once when the value is requested by http-get, and returns the acquired value to the user terminal 70; moreover, the virtual device stores the value as cache at the same time. Then, when the same value is requested again by http-get, the stored value is returned to the user terminal 70 without accessing the device. Note that, when a predetermined time has elapsed since the value was stored, the stored value is erased. Alternatively, when http-post is called once, the stored value is erased. This makes it possible to decrease the inconsistency between the actual state and the cache.

Note that the virtual device may have a function of temporarily storing Web API access while being offline, as a cache function. That is, when the virtual device accepts a Web API call and accesses the corresponding device but the access fails, the Web API access is temporarily stored and, after a predetermined time has elapsed, the stored Web API is used to access the device again.

This allows the virtual device to access the device again, whereby the device can execute the request while the device is online.

(Modification 1)

Note that, when the device 60 is powered on or off, or when the device 60 is moved, the IP address is sometimes changed and access can no longer be established with the access method thus far. In this case, the server 10 only needs to acquire the TD from the device 60 again. For example, when detecting that the connection destination network has been changed, the device 60 can register the TD again.

(Modification 2)

As described above in the first embodiment, the TD in the TD repository 54 is updated when the term of the use contract is entered, when the use contract ends, and when the contents of the contract have been changed. However, since there are cases where the user terminal 70 has already acquired the TD, the user terminal 70 sometimes tries to access the virtual device using the original TD.

Thus, when the TD is updated, the server 10 may notify the user terminal 70 to prompt re-acquisition of the TD. In order to implement this processing, it is only required to equip a function for receiving an event notification in the service application such that the server 10 notifies the service application of an event for re-acquiring the TD.

(Modification 3)

Note that the contract term may be described in advance in the TD such that the user terminal 70 re-acquires the TD based on the information on the contract term. In this case, for example, the contract term only needs to be added to the TD, as illustrated in FIG. 14. The beginning date of the contract term is registered as "begindate" and the end date of the contract term is registered as "enddate" in the TD in FIG. 14.

When the TD in FIG. 14 is used, the user terminal 70 may acquire the TD before the contract begins. In this case, access control can be performed based on begindate. For example, if the current date and time is earlier than begindate, the virtual device simply does not access the device corresponding to the Web API call even when the corresponding Web API is called.

Note that the above processing functions can be implemented by a computer. In that case, a program is provided in which the processing content of a function to be included in a processing apparatus is written. The above processing functions are implemented on a computer by executing the above-mentioned program on the computer. The program in which the processing content is written can be recorded in a computer-readable reading medium (except a carrier wave).

In the case of distributing the program, for example, the program is sold in the form of a portable reading medium such as a digital versatile disc (DVD) or a compact disc read only memory (CD-ROM) in which the program is recorded. Alternatively, it is possible to store the program in a storage device of a server computer and transfer the program from the server computer to another computer via a network.

The computer which executes the program stores, for example, the program recorded in the portable reading medium or the program transferred from the server computer in a storage device of the computer. Then, the computer reads the program from the storage device of the computer and executes processing according to the program. Note that the computer can directly read the program from the portable reading medium and execute processing according to the program. The computer also can sequentially execute processing according to the received program each time when the program is transferred from the server computer.

The embodiments described above are preferred examples of carrying out the present invention. However, the present invention is not limited to these examples, and a variety of modifications can be made without departing from the scope of the present invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a memory; and
   circuitry coupled to the memory and configured to:
   accept registration of a device available for a user and registration of a function of the device available for the user,
   authenticate the user based on a user authentication request received from a terminal,
   generate a Web application programming interface acquired by combining information for access to the device with information for access to the function according to the registration of the device and the registration of the function,
   generate a virtual device that responds to access to the Web application programming interface in cooperation with the device,
   notify the terminal of information including an access method to the Web application programming interface, the access method corresponding to an authenticated user, and
   accept access to the Web application programming interface from the terminal and access the device via the virtual device.

2. The information processing apparatus according to claim 1, wherein
   the information includes information that adds the function of the device available for the user.

3. The information processing apparatus according to claim 1, wherein
   the notified information includes address information for accessing the Web application programming interface, and key information.

4. The information processing apparatus according to claim 1, wherein the circuitry is further configured to:
   monitor access to the Web application programming interface, and
   execute processing based on a monitoring result.

5. The information processing apparatus according to claim 1, wherein the circuitry is further configured to:
   store information acquired when accessing the device, and
   respond to the terminal based on the stored information for a predetermined time.

6. The information processing apparatus according to claim 1, wherein
   the circuitry is further configured to notify the terminal of updating of the information including the access method to the Web application programming interface, when information on the device has been changed.

7. An information processing system comprising a terminal, a device, and an information processing apparatus connected to a network, wherein
   the information processing apparatus is configured to:
   accept registration of a device available for a user and registration of a function of the device available for the user, from the terminal,
   authenticate the user based on a user authentication request received from the terminal,
   generate a Web application programming interface acquired by combining information for access to the device with information for access to the function according to the registration of the device and the registration of the function,
   generate a virtual device that responds to access to the Web application programming interface in cooperation with the device,
   notify the terminal of information including an access method to the Web application programming interface, the access method corresponding to an authenticated user, and
   accept access to the Web application programming interface from the terminal and access the device via the virtual device.

8. An information processing method comprising:
   accepting, by a computer, registration of a device available for a user and registration of a function of the device available for the user;
   authenticating, by the computer, the user based on a user authentication request received from a terminal;
   generating, by the computer, a Web application programming interface acquired by combining information for access to the device with information for access to the function according to the registration of the device and the registration of the function;
   generating a virtual device that responds to access to the Web application programming interface in cooperation with the device;
   notifying, by the computer, the terminal of information including an access method to the Web application programming interface, the access method corresponding to an authenticated user; and
   accepting, by the computer, access to the Web application programming interface from the terminal and accessing the device via the virtual device.

9. The information processing method according to claim 8, wherein the information includes information that adds the function of the device available for the user.

10. The information processing method according to claim 8, wherein the information includes address information for accessing the Web application programming interface, and key information.

11. The information processing method according to claim 8, further comprising:
monitoring, by the computer, access to the Web application programming interface; and
executing, by the computer, processing based on a monitoring result.

12. The information processing method according to claim 8, further comprising
storing, by the computer, information acquired when the device is accessed, and responding to the terminal based on the stored information for a predetermined time.

13. The information processing method according to claim 8, wherein, in the notifying, the terminal is notified of updating of the information including the access method to the Web application programming interface, when information on the device has been changed.

* * * * *